Nov. 13, 1928.
H. H. CRAGG
1,691,226
INSECT SCREEN
Original Filed Feb. 25, 1926
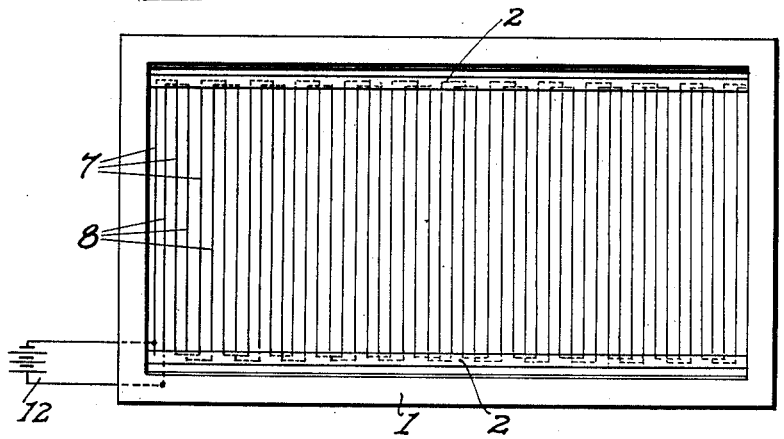
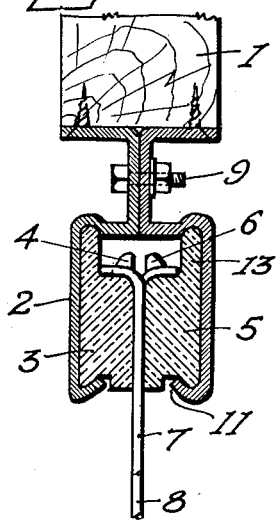
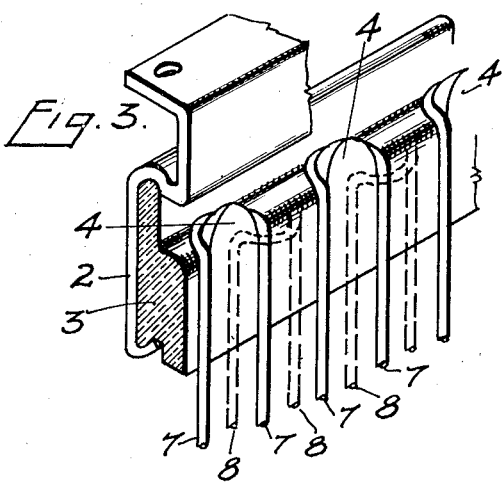

Patented Nov. 13, 1928.

1,691,226

UNITED STATES PATENT OFFICE.

HARRY HUMPHREY CRAGG, OF CALGARY, ALBERTA, CANADA.

INSECT SCREEN.

Application filed February 25, 1926, Serial No. 90,625. Renewed September 15, 1928.

My invention relates to improvements in insect screens, and the objects of my invention are: first, to provide a grid in the opening to be protected, of narrowly spaced parallel wires; second, to form the grid so that alternate wires are connected to the opposite poles of a source of electricity forming an open circuit which is closed by an insect alighting on the alternate wires simultaneously; third, to provide a simple and rigid means of mounting the grid for use in the opening to be protected or in the open; fourth, to provide means of insulating the electric grids from the framework of the opening.

With the foregoing objects in view, my invention consists essentially of the novel method of supporting and spacing of the wires in the grid, as described herein, and illustrated in the accompanying drawings.

Referring to the drawings,

Fig. 1 is an elevation of the device showing the wire system.

Fig. 2 is a section through the frame and one pair of the supporting strips.

Fig. 3 is a fractional detail in perspective showing a portion of one of the strips and the wiring thereon.

Similar numerals refer to similar parts throughout the several views.

The frame 1, constitutes the support of the device and is designed to suit the opening to be protected against the ingress of insects. On opposite sides of the frame 1, are mounted strips of dielectric material 3 and 5, one pair to each side of the frame. Strip 3 has formed thereon regularly spaced upstanding studs or projections 4, for the support of the series of wires 7. Strip 5 is similar in every respect to strip 3, and has formed thereon similarly spaced studs 6, supporting the series of wires 8. These strips are clamped together with the studs 4 and 6 staggered in position, so that the wires 7 and 8 come alternately and have no conductive contact.

These insulating strips are profiled substantially as shown in the drawings, with a groove 11, and a continuous rib 13. Supporting the said strips and strengthening same are the metal sheaths 2, of suitable section to engage in the groove 11 and bear on the rib 13. The metal sheaths are further continued upwards and outwards with suitable holes so that they may be bolted together in pairs, and be fastened to the frame 1, by ordinary means.

A source of electrical energy is diagrammatically indicated at 12, with separate conductors of opposite polarity connected to the wire systems 7 and 8.

In forming the grids a pair of insulating strips are arranged with temporary spreaders to suit the opening. A continuous wire is then laced over the opposite studs from one end of the grid to the other, being fastened at the beginning and end. Two such grids are then superimposed with the wires alternating as before described, and the metal sheaths bolted together. When these sheaths are screwed to the supporting frame, the spreaders are removed. The wire systems of the separate grids are then connected to an outside source of electrical energy, when the device is in condition for use. Insects in attempting to pass between the wires form a bridge between the two alternating wires and are killed.

In the preferred embodiment of my device I construct the dielectric strips of moulded glass, which material withstands the weather without deterioration, and is non-hygroscopic. I also contemplate the use of wire which is slightly crimped or waved in the formation of the grids, as such wire yields to slight shock or impact without permanent deformation.

What I claim is:

1. The combination in an insect screen, a frame, two separate and similar grids of wire supported on dielectric strips, forming a plurality of regularly spaced parallel wire members, the grids superimposed with wires facing inwardly so that all wires fall in the same plane with alternate wires belonging to separate grids and without conductive contact between the separate grids, means of supporting the said grids in the frame and maintaining their proper relative position, and means connecting the grids to the opposite poles of a source of electricity.

2. The combination in an insect screen, a frame, two separate grips of parallel wire members superimposed, forming a compound grid with wire spacing equal to half the spacing of either grid individually, serrated dielectric strips supporting the wire members and maintaining the separate grids from conductive contact, all substantially as shown, means of supporting the said grids in the frame, and means connecting the grids to the opposite poles of a source of electricity.

3. The combination in an insect screen, a frame, two separate and similar wire grids of parallel wires, superimposed so that all wires fall in a common plane, alternate wires belonging to separate grids and without conductive contact, dielectric supporting strips for the wires with regularly spaced upstanding studs or projections, metallic supporting sheaths engaged with the dielectric strips and extended to form a connection with the frame, and means connecting the grids to the opposite poles of a source of electricity.

HARRY HUMPHREY CRAGG.